US007699486B1

(12) United States Patent  
Beiner (10) Patent No.: US 7,699,486 B1
(45) Date of Patent: Apr. 20, 2010

(54) ILLUMINATED EYEGLASS ASSEMBLY (76) Inventor: Edward Beiner, 10020 SW. 70th Ave., Miami, FL (US) 33156

( * ) Notice: Subject to any disclaimer, the term of this patent is extended or adjusted under 35 U.S.C. 154(b) by 122 days.

(21) Appl. No.: 11/978,401

(22) Filed: Oct. 29, 2007

(51) Int. Cl.
G02C 1/00 (2006.01)
F21V 21/084 (2006.01)

(52) U.S. Cl. .................. 362/105; 362/103; 351/158
(58) Field of Classification Search ................ 362/103, 362/105, 106; 351/51, 41, 158
See application file for complete search history.

(56) References Cited

U.S. PATENT DOCUMENTS

| 2,638,532 | A | * | 5/1953 | Brady .................... 362/105 |
| 3,060,308 | A | | 10/1962 | Fortuna |
| 3,350,552 | A | | 10/1967 | Lawrence |
| 3,634,676 | A | | 1/1972 | Castellano |
| 3,769,663 | A | | 11/1973 | Perl |
| 4,254,451 | A | * | 3/1981 | Cochran, Jr. ............ 362/103 |
| 4,283,127 | A | | 8/1981 | Rosenwinkel et al. |
| 4,616,297 | A | | 10/1986 | Liu |
| 4,822,160 | A | | 4/1989 | Tsai |
| 4,822,161 | A | | 4/1989 | Jimmy |
| 4,959,760 | A | | 9/1990 | Wu |
| 5,230,558 | A | | 7/1993 | Jong |
| 5,722,762 | A | | 3/1998 | Soll |
| D405,901 | S | | 2/1999 | Feinbloom et al. |
| 5,946,071 | A | | 8/1999 | Feldman |
| 5,997,165 | A | | 12/1999 | Lehrer |
| D428,431 | S | * | 7/2000 | Jordan .................... D16/309 |
| 6,439,738 | B1 | * | 8/2002 | Matthews et al. ......... 362/194 |
| 6,612,695 | B2 | | 9/2003 | Waters |
| 6,612,696 | B2 | | 9/2003 | Waters |
| 6,863,416 | B2 | | 3/2005 | Waters |
| 6,929,878 | B2 | * | 8/2005 | Chen et al. ............... 429/100 |
| 7,438,409 | B2 | | 10/2008 | Jordan |
| 2003/0086053 | A1 | | 5/2003 | Waters |
| 2003/0086054 | A1 | | 5/2003 | Waters |
| 2003/0189824 | A1 | | 10/2003 | Meeder et al. |
| 2003/0206269 | A1 | | 11/2003 | Waters |

FOREIGN PATENT DOCUMENTS

WO    WO 03/040808 A2    5/2003

* cited by examiner

Primary Examiner—Stephen F Husar
Assistant Examiner—James W Cranson
(74) Attorney, Agent, or Firm—Malloy & Malloy, P.A.

(57) ABSTRACT

An illuminated eyeglass assembly includes one or more temple members having an integral lighting assembly structured and disposed to provide an illumination region proximate a user, for example, to illuminate an item within an arm's length of the user. Each integral light assembly includes at least one light source interconnected to a power source via a switch mechanism. Each of the light sources produce a light beam, and the light sources are structured and disposed such that the light beams provide an illumination region immediately proximate the user, thereby permitting the user to perceptively view an item in a low light environment, such as, to permit the user to read menu or a check in a restaurant or nightclub. A system is provided to retrofit an existing eyeglass assembly with one or more temple member having an integral lighting assembly.

12 Claims, 9 Drawing Sheets

ILLUMINATED EYEGLASS ASSEMBLY

BACKGROUND OF THE INVENTION

1. Field of the Invention

The present invention is directed to an illuminated eyeglass assembly comprising one or more integral lighting assembly structured and disposed to generate an illumination region to an area immediately proximate a user, where sufficient illumination is provided to enable the user to perceptively view an item in a low light environment.

2. Description of the Related Art

Eyeglasses have been utilized for a myriad of purposes throughout the years. One of the more common applications include prescription eyeglasses which many people require so as to be able to see clearly, and in more extreme cases, in order to allow a person to be able to see at all. Another common application for eyeglasses include standardized reading glasses which include lenses designed to provide a specific overall degree of magnification to objects which are viewed through them. Additionally, many people have at least one pair of sunglasses which are utilized to at least partially block the often blinding rays of the sun. Yet another common application is related to safety. For example, many manufacturing concerns require their employees and visitors to its facilities to wear glasses having safety lenses to protect their eyes from potential airborne hazards. In still another application, eyeglasses have been utilized simply as fashion or novelty items, having clear glass or plastic lenses which have no effect on the user's vision.

Eyeglasses utilized for the above purposes have been modified in various ways to incorporate some form of a lighting apparatus. There are many circumstances where an additional amount of lighting in the proximity of the user may be required. In addition, there are numerous circumstances wherein a user may need to direct light onto an object while the user's hands remain free for another activity and, in such circumstances, a lighting apparatus which a user may direct with a movement of his or her head have been developed. One such occasion is when the user is trying to view something in his or her hands in a low lighting situation such as often occurs, for example, while reading a menu or a check in a restaurant.

A number of devices have been developed which incorporate a lighting apparatus, similar to a standard penlight, attached to a standard pair of eyeglass frames in various manners. One such device simply provides a clip mechanism which is utilized to attach a standard penlight to an outer surface of one arm of a pair of eyeglasses. While this device achieves the desired result of providing a source of illumination in the proximity of the user which may be directed by the movement of the user's head, the device is bulky and awkward to wear, due to the unbalance in weight caused by the penlight, thereby requiring the user to unduly readjust the eyeglasses into an operative position. In addition, the presence of the penlight on the outer surface of the arm of the eyeglasses detracts from the overall appearance of the eyeglasses, and thus, the user. It is believed that most persons who require eyeglasses to enhance their vision prefer not to attract additional attention to the fact that they require glasses, thus, a device which further detracts from the overall appearance of a pair of eyeglasses is likely to limit the number of people who will actually utilize it.

Another device which provides lighting includes an integral clamp to attach the lighting apparatus to one arm of the eyeglasses. This again results in an unbalanced overall device, which may result in discomfort to the user. Additionally, this device includes a separate power and/or switch mechanism which is attached to the lighting apparatus by an external cord or wire which, once again, detracts from the overall appearance of the device and the user, as well as being a source of further discomfort.

In order to offset the negative aspects of the externally attached lighting mechanisms described above, a number of devices have been developed in which at least one arm of the eyeglass frame is utilized to house the lighting apparatus as well as at least a portion of its power supply and/or such switch means as is required to operate the lighting apparatus. While a number of these devices incorporate a lighting apparatus on both arms of the pair of eyeglasses, thus overcoming the balance problem identified above, they still result in a bulky and awkward appearance of the arms, which must be oversized to accommodate the lighting apparatus, the power supply, switch means, etc., and thus, the overall appearance of the eyeglasses themselves is, once again, bulky and awkward. In addition, a number of these devices include rather complex construction features which are likely to result in increased manufacturing costs, thus making such devices less accessible for widespread usage among consumers.

In addition, several of these types of devices include a power supply and switch means which are not housed on the arm of the eyeglasses, but rather are included in a separate unit which is connected to the lighting apparatus on the eyeglasses via a power cord or wire, as described above. While this reduces some of the problems related to the bulkiness of the eyeglass assembly, it creates a new problem related to mobility of the overall assembly, particularly in those devices which require an alternating current to supply power to the lighting apparatus. In addition, as noted above, the presence of a power cord or wire extending down from the eyeglasses further detracts from the overall appearance of the eyeglasses and the user, and provides a further source of discomfort.

With the advent of micro-electronic components, devices have been developed incorporating much smaller lighting apparatus in combination with eyeglasses, for example, light emitting diodes, which resolve some of the negative aspects related to the devices described above. These types of devices, however, have thus far been limited to novelty type devices. For example, one such device is structured merely to give the appearance of light emanating from the eyes of the user, while others have been developed to provide a flashing array of lights about the frame of a pair of eyeglasses, neither of which serves the useful purposes described above. Additionally, such devices, at least with respect to those employing a flashing array of lights, require additional circuitry to achieve the flashing effect which likely results in increased cost and, therefore, limits their widespread usage.

As such, it would be beneficial to provide a lightweight, comfortable, attractive, and affordable pair of eyeglasses incorporating integral lighting which is simple and economical to manufacture to allow widespread usage among persons requiring such a device. It would be preferable for such a device to incorporate an integral lighting assembly including a light source, a power source and a switch mechanism in an unobtrusive manner, i.e., the eyeglass assembly must be comfortable for a user to wear and the integral lighting assembly must not be readily apparent to other persons when not in use. Additionally, it would be helpful for such an assembly to be structured to provide an illumination region proximate a user to facilitate illumination of an item which the user is holding, such as a menu or a check, in a low light environment. Further, it would be beneficial to provide a system whereby existing eyeglasses could be readily and economically retrofitted to incorporate an integral lighting assembly.

SUMMARY OF THE INVENTION

The present invention is directed to an illuminated eyeglass assembly comprising an integral lighting assembly. The illuminated eyeglass assembly includes a frame and a pair of temple members which are cooperatively structured to support the illuminated eyeglass assembly on a user's head in an operative position. Additionally, the frame includes a nosepiece and, in at least one embodiment, a pair of lens support members structured to facilitate interconnecting a pair of lenses to the frame. In the present invention, the lenses may be any one of the types commonly included in eyeglasses including, by way of example only, specific prescription lenses, standard correctional lenses as in, for example, over-the-counter reading glasses, sunglass lenses, tinted lenses, or clear, non-corrective glass or plastic lenses.

More in particular, one or both of the temple members of the present invention may include an integral lighting assembly. The temple members are structured and disposed to cooperatively interconnect to the frame, thereby permitting the integral lighting assembly to be mounted to the illuminated eyeglass assembly in an unobtrusive manner. Specifically, the integral lighting assembly is incorporated into the temple member(s) in a manner which provides a comfortable fit on a user, while at the same time minimizing any indication of its presence when its corresponding light source is not illuminated, as will be appreciated better from the detailed description and figures which follow.

In addition, the temple members of the present invention are structured and disposed such that the light beams generated by corresponding light sources of the integral lighting assemblies produce an illumination region proximate the user. The illumination region is at least partially defined by the light beam(s) producing sufficient illumination to permit the user to perceptively view an item disposed between about 2 to 4 feet from the user's head in a low light environment, such as, to permit the user to read a menu or check in a dimly lit restaurant or nightclub, a ticket or to see a ticket or program in a darkened theater, etc. In at least one embodiment, the illumination region is at least partially defined by an overlap of the light beams generated by the light sources, wherein the overlap is disposed approximately an arm's length from the user, i.e., approximately 2 to 4 feet from the illuminated eyeglass assembly.

Each integral lighting assembly of the present invention also includes a power source and a switch mechanism. The power source may include one or more dry cell batteries, and in one preferred embodiment, the power source comprises a plurality of replaceable dry cell batteries, thereby allowing the user to extend the overall useful life of the eyeglass assembly. At least one embodiment of the integral lighting assembly includes a power supply assembly structured and disposed to support a power source in an operable disposition in a corresponding one of the temple members.

In one alternate embodiment, the integral lighting assembly of the present invention comprises an auto-test circuit structured to initiate a circuit test, the circuit test being at least partially defined by activation of a corresponding light source. More in particular, a circuit test is initiated upon disposition of said power source into said operative disposition in said power supply assembly, wherein the circuit test is terminated by deactivation of the light source, such as by operation of the switch mechanism.

These and other objects, features and advantages of the present invention will become more clear when the drawings as well as the detailed description are taken into consideration.

BRIEF DESCRIPTION OF THE DRAWINGS

For a fuller understanding of the present invention, reference is made to the following detailed description in connection with the accompanying drawings in which.

Like reference numerals refer to like parts throughout the several views of the drawings.

DETAILED DESCRIPTION OF THE PREFERRED EMBODIMENT

Figure 1:
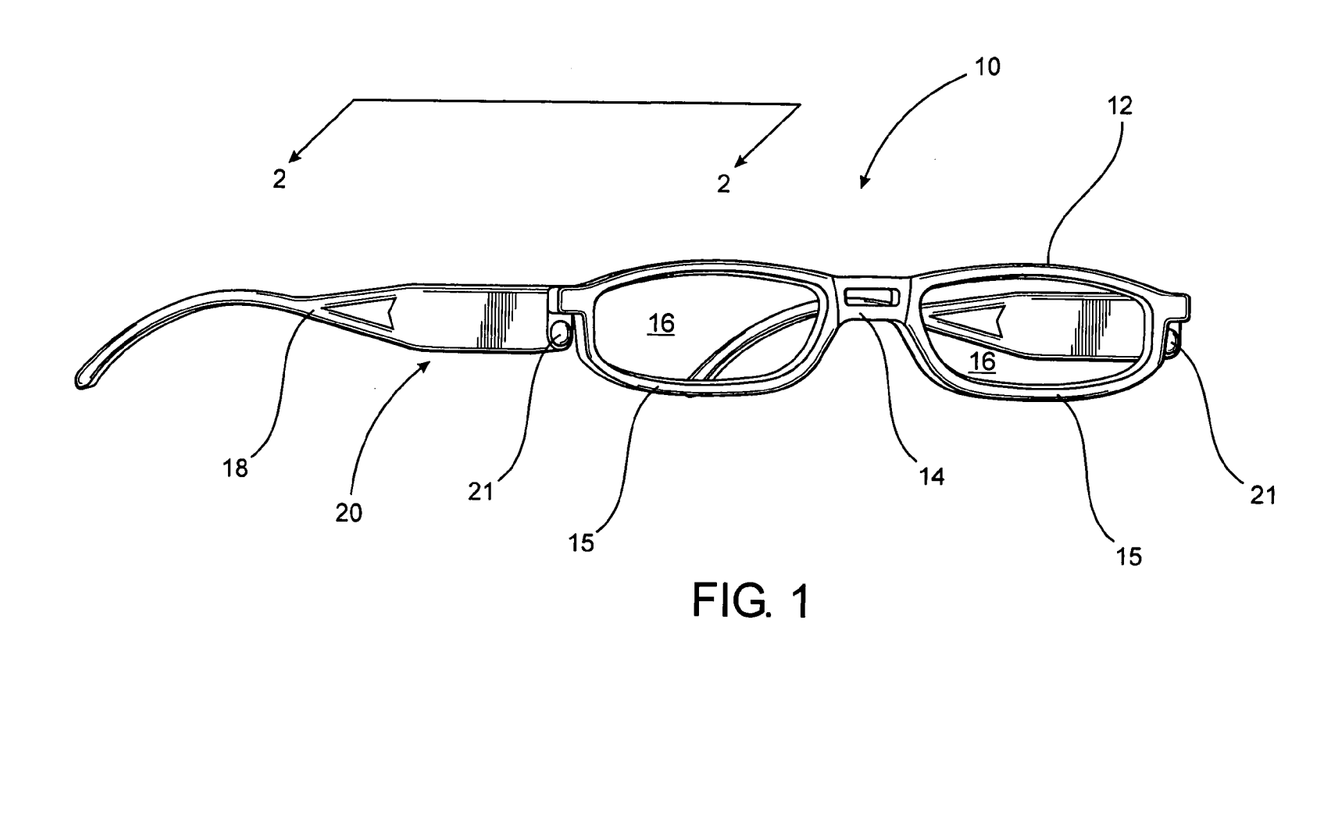
FIG. 1 is a perspective view of one embodiment of an illuminated eyeglass assembly having an integral lighting assembly illustrating a power supply assembly and a switch mechanism disposed in a substantially imperceptible orientation.
Figure 2:
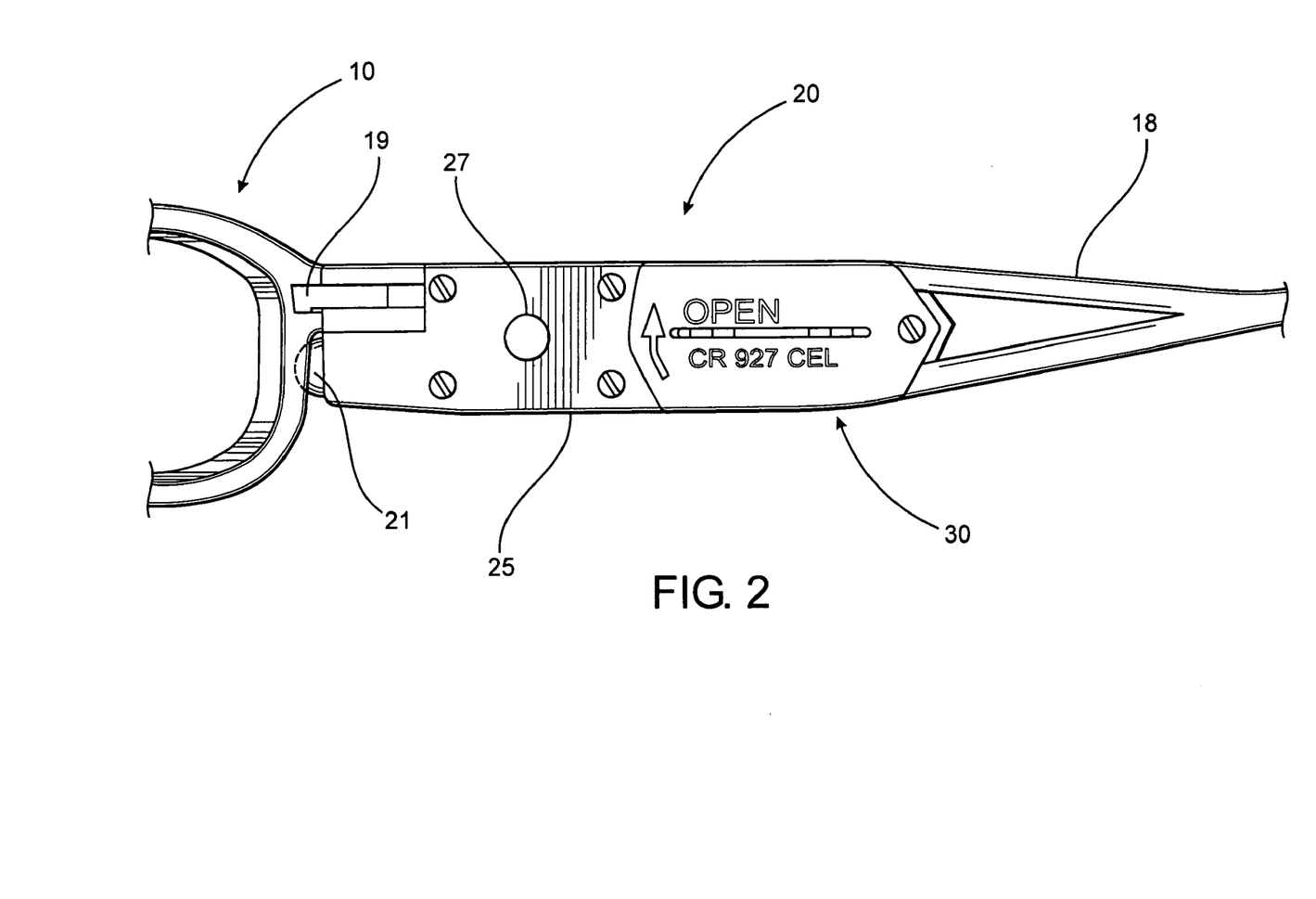
FIG. 2 is a partial perspective view of the embodiment of FIG. 1 along lines 2-2 thereof.

As indicated above, the present invention is directed to an illuminated eyeglass assembly with an integral lighting apparatus, generally shown as 10 throughout the figures. The illuminated eyeglass assembly 10 includes a frame 12 having a nosepiece 14 and, in at least one embodiment, a pair of lens support members 15. In the embodiment of FIG. 1, the lens support members 15 are structured to substantially surround the periphery of each of a pair of lenses 16. Additionally, as illustrated in FIG. 2, an interconnect 19 is provided proximate a distal portion of each lens support member 15 such that each of a pair of temple members 18 may be interconnected to the frame 12. The interconnect 19, in at least one embodiment, comprises a hinged or pivot type of connection such that the temple members 18 may be disposed in a folded orientation for storage. In an alternate embodiment, the interconnects 19 may provide for a rigid connection of the temple members 18 to the frame 12. The lens support members 15, in at least one embodiment, are structured to only partially surround a periphery of a corresponding one of the lenses 16, for example, along an upper portion of the periphery of each. In yet one further embodiment, the frame 12 comprises a "frameless" design, such that the nosepiece 14 is directly attached to each lens, and an interconnect 19 is affixed directly to a distal portion of each lens 16, to facilitate interconnection of the temple members 18.

As illustrated in FIG. 1, the pair of temple members 18 are interconnected to the frame 12, at a corresponding interconnect 19, such that the frame 12 and the temple members 18 are cooperatively structured to support the illuminated eyeglass assembly 10 on the head of a user in an operative position. More in particular, each temple member 18 is structured to overly at least a portion of a different one of the user's ears, while the nosepiece 14 is structured to rest securely yet comfortably along the bridge of the user's nose, such that the illuminated eyeglass assembly 10 remains in a substantially stationary position on the user's head during normal usage.

The components of the frame 12 of the present invention may be constructed from one or more of the variety of materials commonly utilized for manufacturing eyeglass frames including, but not limited to, metal, plastic, or other synthetic materials. Further, the illuminated eyeglass assembly may utilize any of a number of different types of lenses 16 including, but not limited to, prescription lenses, standard magnification lenses, safety lenses, tinted, lenses, sunglass lenses, etc.

The illuminated eyeglass assembly 10, as noted above, further comprises an integral lighting assembly, generally as shown as 20. In particular, the integral lighting assembly 20 is disposed in a cooperative engagement with the frame 12, wherein cooperative engagement is at least partially defined by the integral lighting assembly 20 being structured and disposed in an unobtrusive manner, such as is shown throughout the figures. In particular, and as illustrated best in FIGS. 1 and 2, the integral lighting assembly 20 is at least partially mounted onto one or both of the temple members 18 of the frame 12 while maintaining normal relative dimensions of the components of the temple members 18 and the frame 12. Thus, the overall appearance of a standard pair of eyeglasses is maintained, unlike the numerous prior art devices requiring oversized frame components to accommodate the lighting apparatus installed therein or thereon.

Additionally, the integral lighting assembly 20 of the present invention is structured to provide an illumination region 50 in proximity to the user, and more in particular, immediately proximate the user's head, when the illuminated eyeglass assembly 10 is disposed in an operative position on the user. In at least one embodiment, the integral lighting assembly 20 is structured to provide an illumination region 50 which is at least partially defined by sufficiently illuminating an item within about an arm's length of the user, i.e., approximately 2 to 4 feet from the user's head, such that the user can perceptively view the item in a low light environment, as is illustrated best in FIG. 5. For example, the illuminated eyeglass assembly 10 of the present invention may be utilized to provide an illumination region 50 which provides sufficient illumination to a menu or a check such that the user is able to read the same in a dimly lit restaurant or nightclub, i.e., sufficient illumination is defined by permitting the user to perceptively view the menu or check such that it may be read. Alternatively, the illumination region 50 may be such that it provides sufficient illumination to permit a user to temporarily view and read a ticket, an aisle or seat number, or a program in a darkened theater. As another example, the illumination region 50 may be such that the integral lighting assembly 20 provides sufficient illumination to a page of a book, a map, or other reading material which the user is holding in a manner extended outwardly from the user's body. Alternatively, the illumination region 50 may be such that it illuminates one or more pieces of equipment on which a user is working, which again, may be disposed within an arm's length of the user, such that the user can readily view the pieces. As will be appreciated from the foregoing, numerous other instances of an illumination region 50 providing "sufficient illumination" may be defined by the variety of low light environments in which a user may find himself or herself, in which a local source of illumination will prove beneficial or, perhaps, indispensable to the user.

The integral lighting assembly 20 comprises at least one light source 21. In at least one embodiment, the integral lighting assembly 20 of the present invention comprises a plurality of light sources 21. In the illustrative embodiments of the figures, a different one of each of the plurality of light sources 21 is mounted to an end of each temple member 18, adjacent a corresponding interconnect 19 to the frame 12, such that the light source is directed in a forward direction relative to the frame 12, and correspondingly, relative to the user's head and eyes. Of course, it is within the scope of the present invention for one or more light sources 21 of the integral lighting assembly to be mounted directly to the frame 12, such as on nosepiece 14 and/or lens support members 15. As one example, a different one of each of the plurality of light sources 21 is mounted to the distal end of each of the lens support members 15. In yet another embodiment, a different one of each of the plurality of light sources 21 are mounted directly to a different one of each of the pair of lenses 16. In at least one embodiment, the frame 12 further comprises one of more adornments such as, by way of example only, synthetic gemstones, to assist in mounting the light source 21 to the frame 12 in an unobtrusive manner by further camouflaging the presence of the light source 21, while it is not illuminated. As will be appreciated from the foregoing, the present invention encompasses numerous configurations for positioning one or more light sources 21 relative to the frame 12, temple members 18, and/or lenses 16.

The light source 21 or plurality of light sources 21 may comprise any of the numerous micro-electronic lighting mechanisms as are readily available, such as, for example, miniature incandescent light bulbs. One embodiment of the present invention utilizes one of more light emitting diodes as the light source 21. The light emitting diode(s), in at least one embodiment, is selected to maximize the illumination generated and provided to an illumination region 50, such that the illumination region 50 comprises sufficient illumination for the user may perceptively view an item at arm's length, i.e., 2 to 4 feet, in a low level light environment, for example, sufficient illumination to permit the user to read a menu or check in a dimly lit restaurant. Of course, it will be appreciated by one of skill in the art that the light emitting diodes may be selected so as to project any one of a variety of colors of light. Thus a color may be selected so as further accentuate the appearance of the frames, to provide a source of illumination which is soothing to the wearer.

Figure 3:
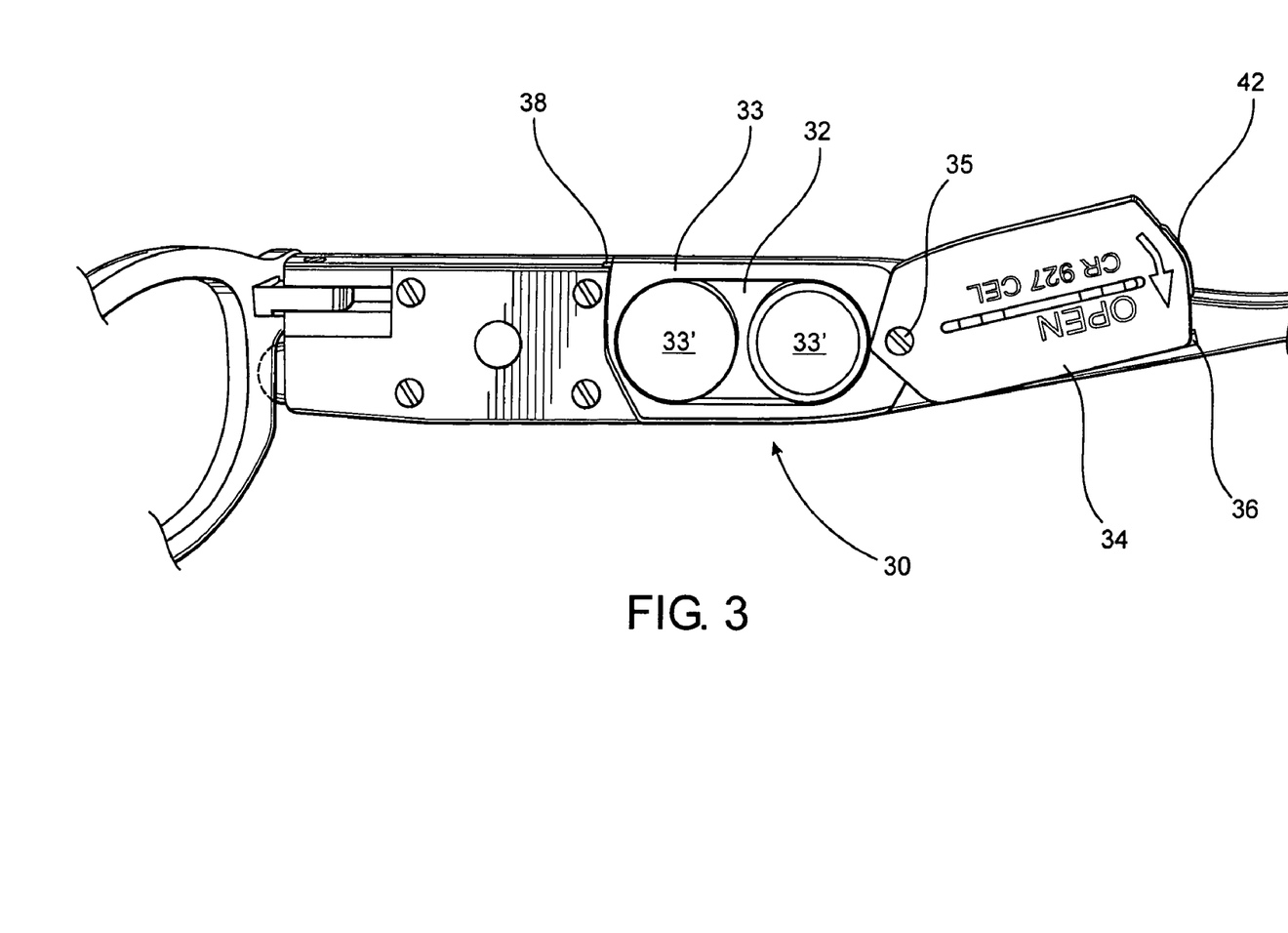
FIG. 3 is the partial perspective view of the illuminated eyeglass assembly of FIG. 1 illustrating one embodiment of a cover of the power supply assembly disposed in an open configuration.

The integral lighting assembly 20 of the present application further comprises a power supply assembly 30, as illustrated best in FIGS. 2 and 3. As illustrated in FIG. 2, the power supply assembly 30 is structured to support a power source 33 in an operative position and in an electrically communicative relationship with a corresponding light source 21, thereby permitting energization and illumination of the same. More in particular, the power supply assembly 30 is structured and disposed to support one or more batteries 33' in an operative disposition in a battery compartment 32 disposed in a corresponding temple member 18.

Figure 4:
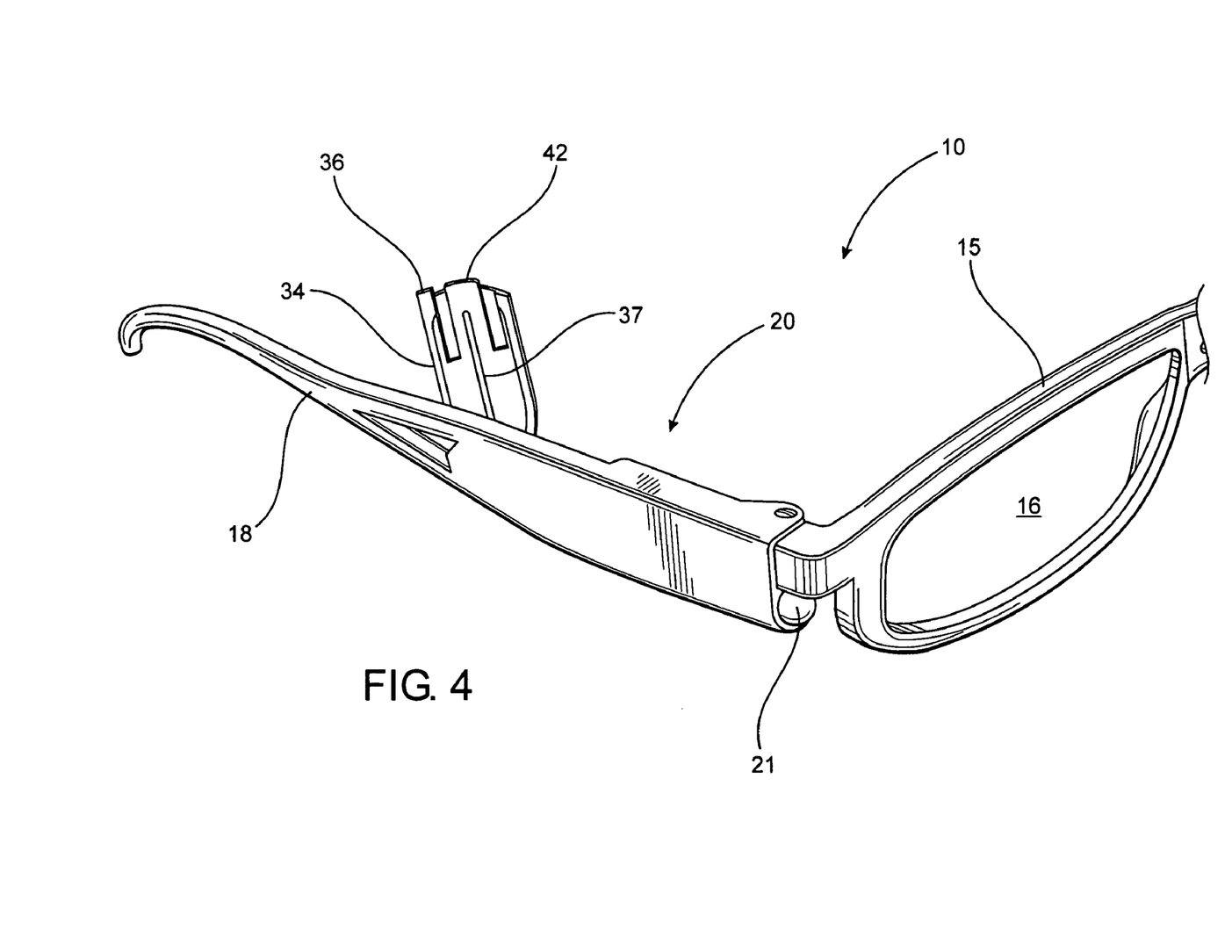
FIG. 4 is a partial perspective view of the illuminated eyeglass assembly of FIG. 1 further illustrating the cover of the power supply assembly.

In order to retain the power source 33 in an operative disposition, the power supply assembly 30 further comprises a cover 34 disposed in an overlying relation to the battery compartment 32, as illustrated in the figures. The cover 34 is movably, yet securely positionable relative to the battery compartment 32 between a closed configuration, as illustrated in best FIG. 2, and an open configuration, as illustrated in FIGS. 3 and 4. In at least one embodiment, the cover 34 is pivotably secured to the temple member 18, as at pivot member 35, and is pivotably positionable between the open and closed configurations.

As illustrated in FIGS. 3 and 4, cover 34 comprises at least one tab 36 structured to be received within slot 38 of the temple member 18. More in particular, the slot 38 is structured to receive one or more tabs 36 when the cover 34 is positioned to be disposed into the closed configuration. FIG. 4 further illustrates the cover 34 comprising a contact member 37, wherein the contact member defines at least a portion of the electrical circuit of the illuminated lighting assembly 20. In at least one embodiment, the contact member 37 is biased into contact with the power source 33, and in one further embodiment, with one or more batteries 33', when the cover 34 is disposed in the closed configuration. In one further embodiment, the contact member 37 is biased so as to facilitate retention of the cover in the closed configuration.

The integral lighting assembly 20, as noted above, comprises at least one power source 33 structured to energize the at least one light source 21 of the integral lighting assembly 20. In at least one embodiment, the power source 33 comprises a battery 33', as utilized in small electronic devices such as cameras and hearing aids. In one preferred embodiment, the battery 33' is a replaceable dry cell battery thereby allowing the user to extend the useful life of the eyeglass assembly 10 of the present invention. In at least one embodiment, the replaceable dry cell battery 33' comprises a lithium battery having an output rating of 3 volts. The illuminated eyeglass assembly 10 may include a plurality of power sources 33, each structured to energize a different one of a plurality of light sources 21 of the integral lighting assembly 20.

The integral lighting assembly 20 further comprises a switch mechanism 25, such that the light source(s) 21 may be selectively energized when the user desires an illumination region 50 to read or otherwise view an item in a low light environment, as well as to selectively de-energize the light source 21 when not in use, so as to conserve the power source 33. In one embodiment, the switch mechanism 25 comprises at least one pair of contact points disposable between an open configuration and a closed configuration. More specifically, the switch mechanism 25 at least partially defines an electrical circuit between the light source 21, the power source 33, and wherein a path of flow of an electric current from the power source 33 to at least one light source 21 is through the contact points of the switch mechanism 25. The present invention may utilize any one of the materials commonly utilized as the conductor to provide electrical communication between the various components of the electrical circuit.

Figure 5:
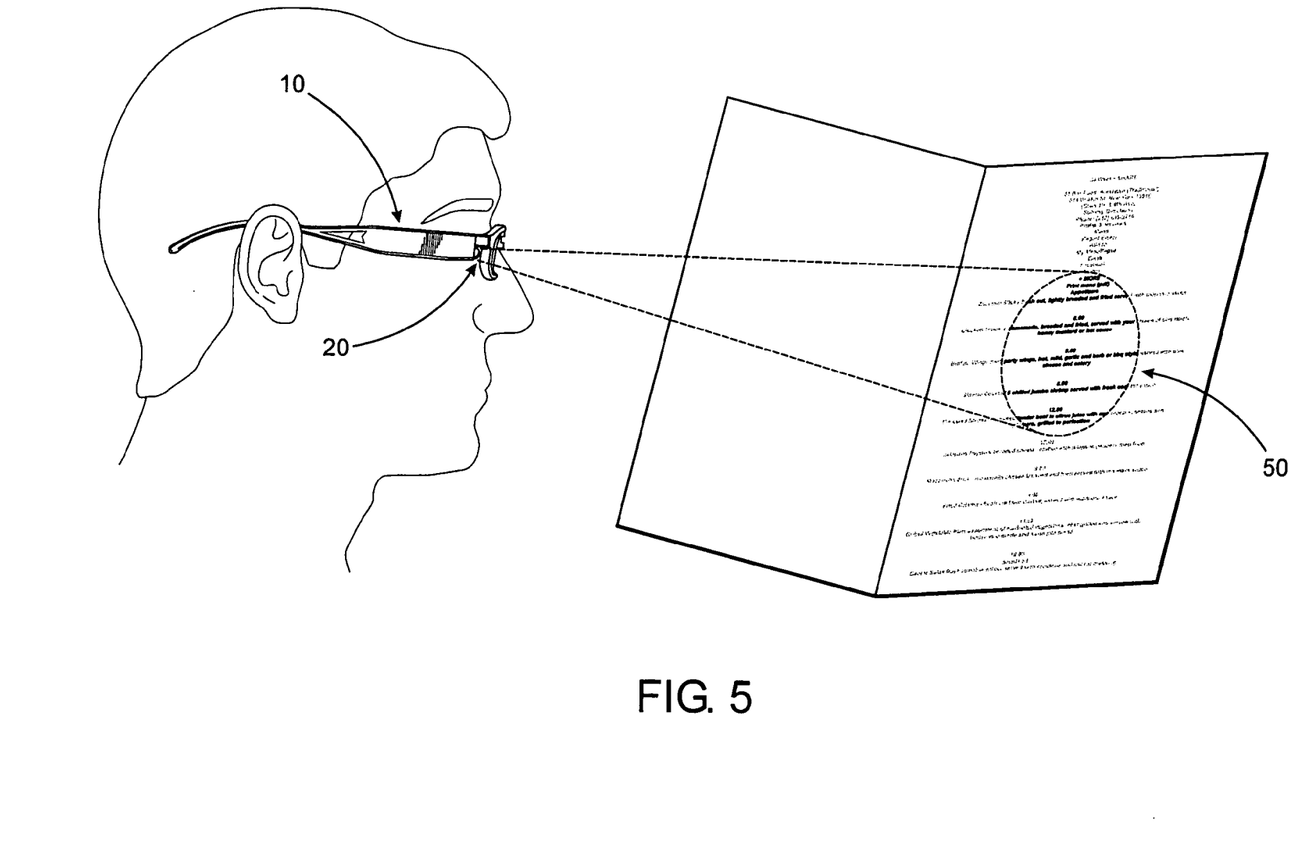
FIG. 5 is a perspective view of the embodiment of an illuminated eyeglass assembly of FIG. 1 disposed in an operative position on a user's head illustrating an illumination region, and the power supply assembly and the switch mechanism disposed in a substantially imperceptible orientation.
Figure 6:
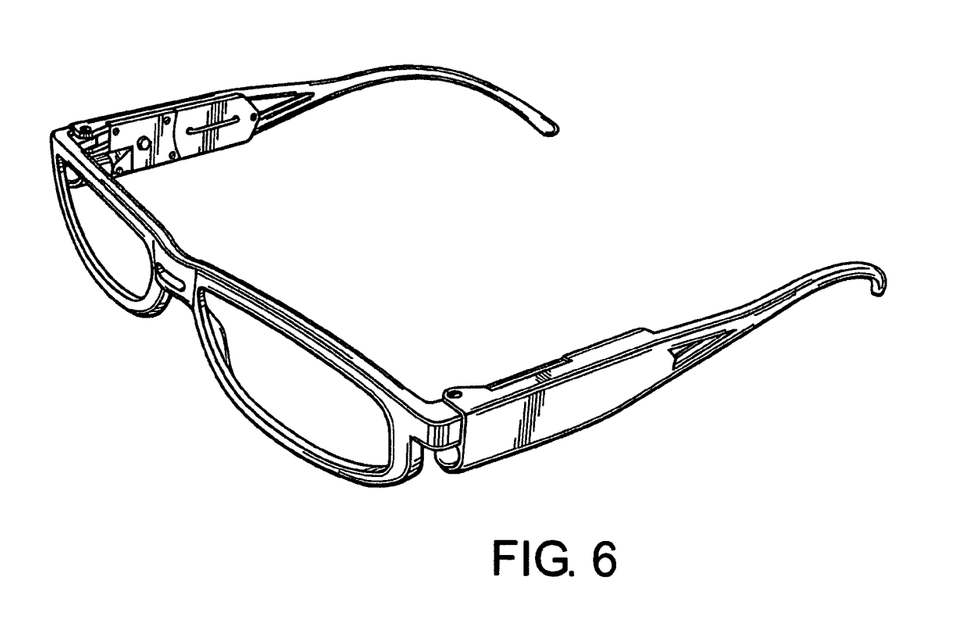
FIG. 6 is a front perspective view illustrating a design of one embodiment of an illuminated eyeglass assembly.
Figure 7:
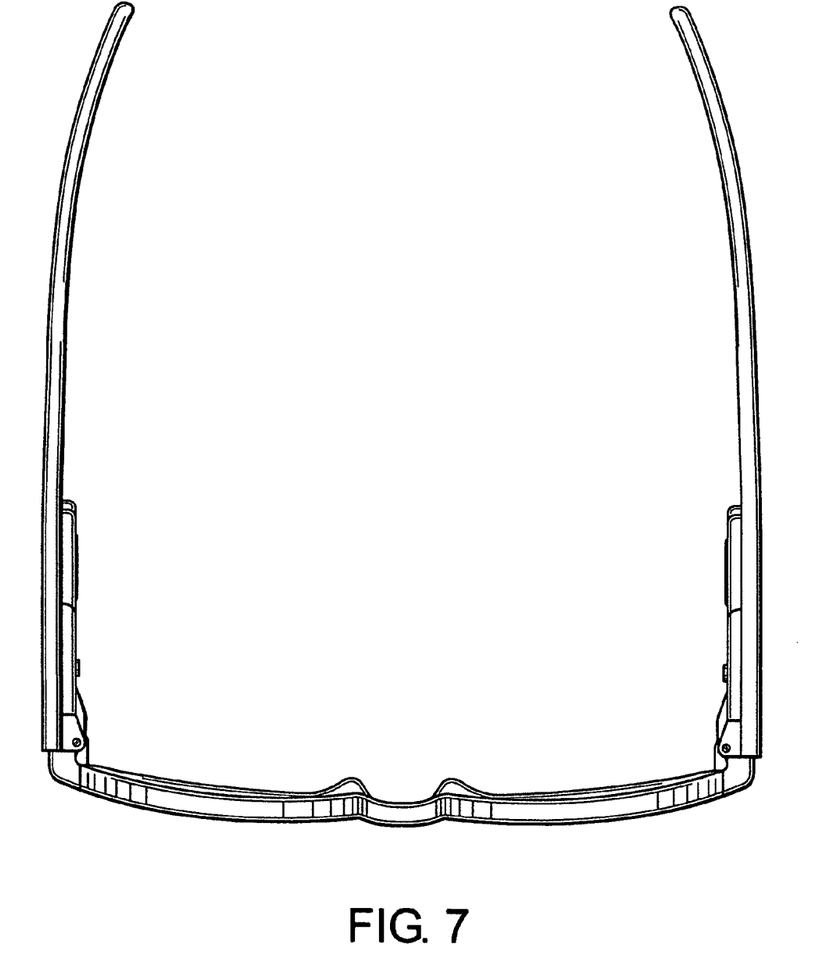
FIG. 7 is a top view of the design of FIG. 6.
Figure 8:
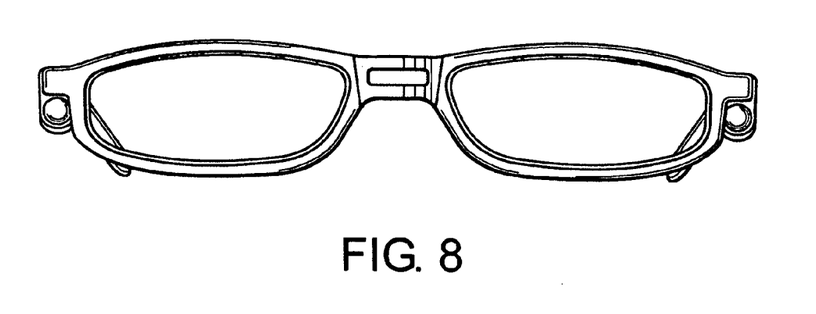
FIG. 8 is a front view of the design of FIG. 6.
Figure 9:
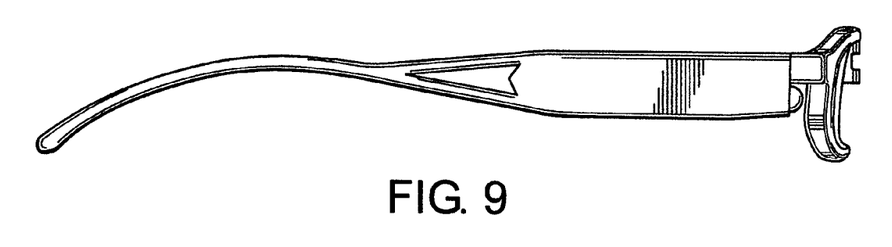
FIG. 9 is a right side view of the design of FIG. 6.
Figure 10:
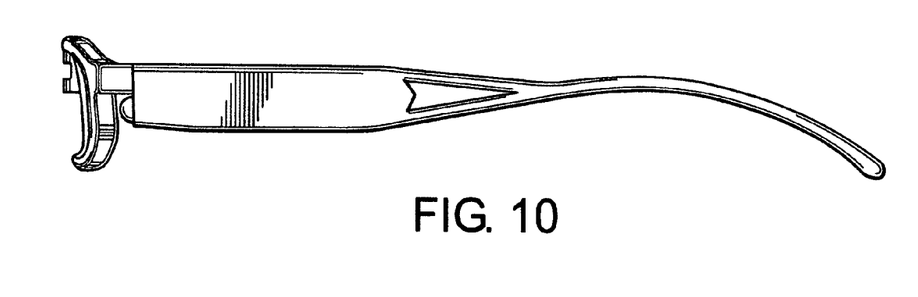
FIG. 10 is a left side view of the design of FIG. 6.
Figure 11:
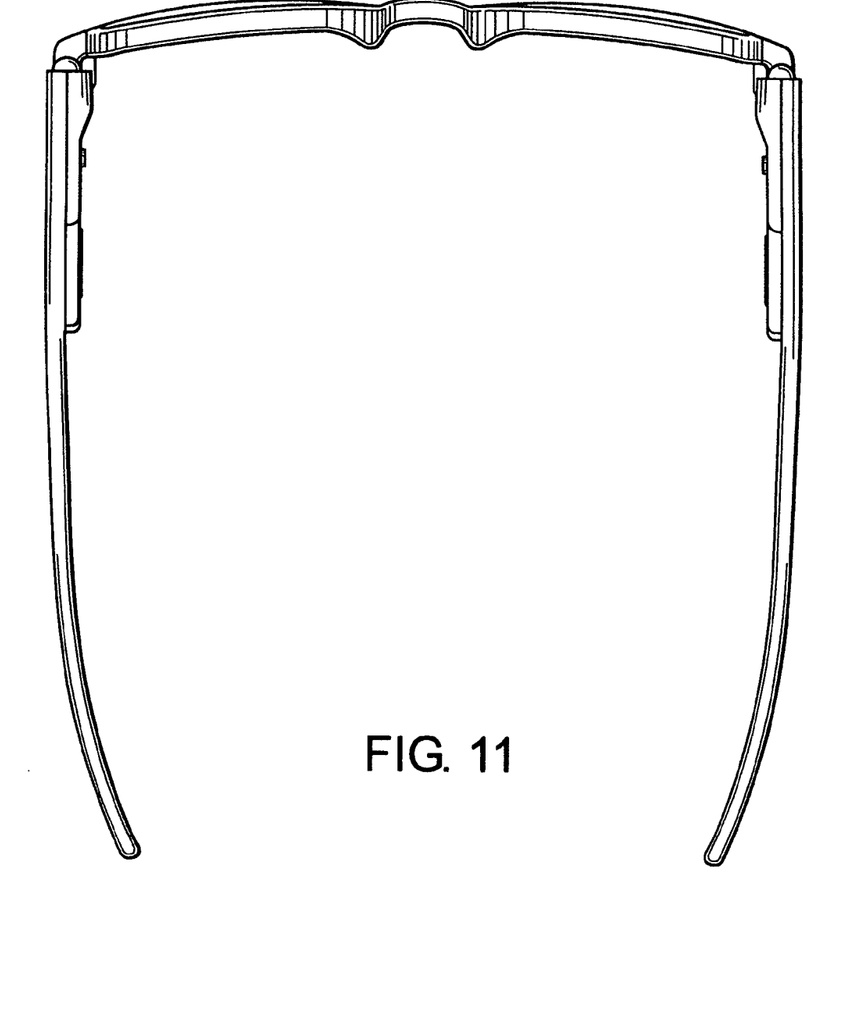
FIG. 11 is a bottom view of the design of FIG. 6.
Figure 12:
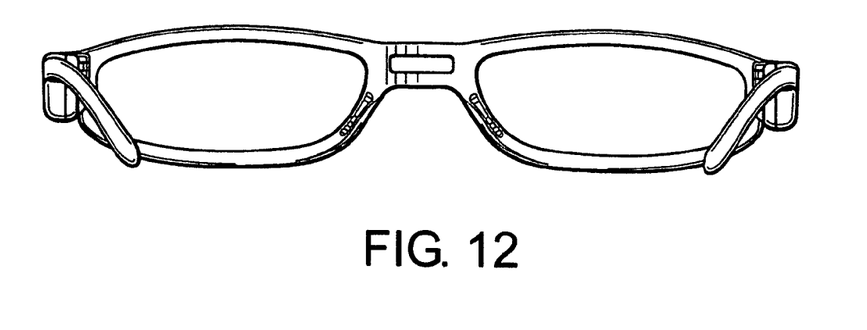
FIG. 12 is a rear view of the design of FIG. 6.

One feature of the illuminated eyeglass assembly 10 of the present invention is that the power supply assembly 30 and the switch mechanism 25 are cooperatively structured and disposed in a substantially imperceptible orientation relative to a third party when the illuminated eyeglass assembly 10 is disposed in an operative position on the user's head, as is illustrated best in FIGS. 2 and 5.

As noted above, the switch mechanism 25 comprises a switch member 27 structured to dispose the contact points between the open configuration and the closed configuration. In at least one embodiment, the switch member 27 is moveable, such that a contact point mounted to the switch member 27 is movable into and out of the closed configuration with another contact point, thereby opening and closing the electrical circuit. Of course, it is understood to be within the scope and intent of the present application for any of a variety of switches to be utilized, provided that they are installed and operable such that it remains substantially imperceptible to a third party proximate a user.

FIGS. 6 through 12 are illustrative of an original and ornamental design of one embodiment of an illuminated eyeglass assembly in accordance with the present invention.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An illuminated eyeglass assembly comprising:
   a frame having a nosepiece and a pair of lens support members,
   a pair of temple members cooperatively interconnected to said frame to support said illuminated eyeglass assembly in an operative position on a user's head,
   at least one of said temple members comprising an integral lighting assembly, wherein said integral lighting assembly comprises:
   a light source disposed in a communicative relationship with a power source via an electrical circuit,
   a power supply assembly structured to support said power source in an operative disposition,
   said power supply assembly comprises a battery compartment and a cover disposed in an overlying relation thereto, wherein said cover is movably interconnected to said temple member and is positionable between an open configuration and a closed configuration, and said cover is pivotably secured to said temple member to prevent detachment,
   said temple member comprises a slot and said cover comprises at least one tab, said slot structured to receive said at least one tab when said cover is disposed into said closed configuration,
   a switch mechanism disposed in said communicative relationship between said light source and said power source,
   said power supply assembly and said switch mechanism being cooperatively structured and disposed in a an imperceptible orientation when said illuminated eyeglass assembly is disposed in an operative position on the user's head, and
   said light source structured to generate a light beam producing an illumination region immediately proximate the user's head when said illuminated eyeglass assembly is disposed in said operative position on the user's head, wherein said illumination region is at least partially defined by sufficient illumination to permit the user to perceptively view an item in a low light environment.

2. The assembly as recited in claim 1 wherein said cover comprises a contact member defining at least a portion of said electrical circuit.

3. The assembly as recited in claim 2 wherein said contact member is biased into contact with said power source when said cover is disposed in said closed configuration.

4. The assembly as recited in claim 3 wherein said contact member is further biased to facilitate retention of said cover in said closed configuration.

5. The assembly as recited in claim 1 wherein each of said temple members comprises an integral lighting assembly, each said integral lighting assembly having a light source disposed in a communicative relationship with a power source.

6. The assembly as recited in claim 5 wherein each of said light sources is structured to generate a light beam, said light sources being cooperatively disposed such that said light beams produce said illumination region.

7. The assembly as recited in claim 6 wherein said illumination region is at least partially defined by said light beams producing sufficient illumination to permit the user to perceptively view and read an item disposed between about 2 to 4 feet from the user's head in a low light environment when said illuminated eyeglass assembly is disposed in said operative position on the user's head.

8. An illuminated eyeglass assembly comprising:
- a frame having a nosepiece and a pair of lens support members,
- a pair of temple members cooperatively interconnected to said frame and structured to support said illuminated eyeglass assembly on a user's head,
- each of said temple members having an integral lighting assembly, wherein each said integral lighting assembly comprises:
  - a light source disposed in a communicative relationship with a power source via an electrical circuit, wherein each of said light sources comprises a light emitting diode structured to generate a light beam,
  - a power supply assembly structured to support said power source in an operative disposition, said power source comprising at least one replaceable battery,
  - said power supply assembly further comprises a battery compartment and a cover disposed in an overlying relation thereto, wherein said cover is pivotably secured to said temple member and is positionable between an open configuration and a closed configuration,
- each of said temple members further comprises a slot and each of said covers comprises a tab, each said slot structured to receive said tab of a corresponding one of said covers when disposed in said closed configuration,
- a switch mechanism disposed in said communicative relationship between each said light source and said power source,
- said power supply assembly and said switch mechanism being cooperatively structured and disposed in a an imperceptible orientation when said illuminated eyeglass assembly is disposed in an operative position on the user's head, and
- said light sources are cooperatively structured such that said light beams produce an illumination region immediately proximate the user's head when said illuminated eyeglass assembly is disposed in said operative position on the user's head, said illumination region is at least partially defined by sufficient illumination to permit the user to perceptively view an item disposed between about 2 to 4 feet from the user's head in a low light environment.

9. The assembly as recited in claim 8 wherein said power source comprises two lithium batteries, each of said lithium batteries having an output rating of 3 volts.

10. The assembly as recited in claim 8 wherein each of said covers comprises a contact member defining at least a portion of a corresponding one of said electrical circuits.

11. The assembly as recited in claim 10 wherein each of said contact members is biased into contact with a corresponding one of said power sources when said cover is disposed in said closed configuration.

12. The assembly as recited in claim 11 wherein each of said contact members is further biased to facilitate retention of a corresponding one of said covers in said closed configuration.

* * * * *